May 28, 1968     D. F. McKEOWN     3,385,387

SPEED AND DIRECTIONAL CONTROL FOR VEHICLE

Filed Feb. 15, 1966

David F. McKeown
INVENTOR

BY

*Kolisch + Hartwell*

Attys.

United States Patent Office 3,385,387
Patented May 28, 1968

3,385,387
SPEED AND DIRECTIONAL CONTROL
FOR VEHICLE
David F. McKeown, Rte. 2, Box 352,
Hood River, Oreg. 97031
Filed Feb. 15, 1966, Ser. No. 527,575
3 Claims. (Cl. 180—6.48)

ABSTRACT OF THE DISCLOSURE

A vehicle with swingable boom including a joy stick mounted at the boom's free end for operating valve mechanism mounted at the boom's journaled end, such valve mechanism controlling flow of pressure fluid to reversible motors, the latter operating when actuated to propel the vehicle over the ground.

---

This invention relates to vehicles in general, and more particularly to novel means for steering a vehicle, and controlling the speed at which it moves and its direction of movement. As contemplated herein, direction, turning, and speed are controlled by suitable actuation of a single operating lever, which is effective to control the supply of an energizing medium to motors which rotate vehicle propelling means located on opposite sides of the vehicle.

In my copending application entitled "Vehicle With Boom," having Serial No. 388,229, and filed Aug. 7, 1964 now U.S. Patent No. 3,243,061, I disclose a vehicle including a boom, which boom supports an operator's platform adjacent its free end. One of the indicated uses for such a vehicle is to provide a mobile support for a worker tending trees in an orchard. In this and other uses of the vehicle, it is desirable that control of vehicle movement be through means accessible to an operator on this platform. It is also important that any control system selected be relatively simple, and easily manipulated with one hand. The speed and directional control system contemplated by this invention has particular utility in connection with vehicles of the type described in my above-identified copending application, and in this application the invention is described in conjunction with such a vehicle. It should be understood however, that features of this invention have applicability in broader fields than the specific one indicated, and it is intended, therefore, that this invention be limited only as required by the appended claims.

A general object of this invention is to provide a novel speed, turning, and direction control system for a vehicle featuring a single operating lever for controlling the vehicle.

More specifically, an object of the invention is to provide a novel form of vehicle, including a separate motor for driving each of two rotatable vehicle propelling means provided on opposite sides of the vehicle, and novel means controlling the supply of an energizing medium to these motors, whereby their running direction and speed may be controlled.

An important part of the invention is its relative simplicity without sacrifice of reliability and practical operation. As contemplated herein, according to one embodiment of the invention, the use of clutches and like mechanisms for establishing a drive connection is eliminated.

Another object is to provide a vehicle with a speed, turning and direction control system, where the operating lever for actuating the system takes the form of a joy stick having a universal mounting, and novel means links this joy stick to a pair of valves provided for the purpose of controlling flow of hydraulic fluid to reversible hydraulic motors driving wheels in the vehicle. With movement of the joy stick back and forth, and with the linkage contemplated connecting the joy stick to the valves, similar adjustments in both valves are produced simultaneously, whereby the motors receiving fluid through the valves are operated in a similar manner. On movement of the joy stick in a direction at right angles to the first mentioned direction valve adjustment in the pair of valves is dissimilar, and a motor operation results which is dissimilar.

These and other objects and advantages are attained by the invention, and the same is described hereinbelow in conjunction with the accompanying drawings, wherein.

Figures 5, 6, 7:
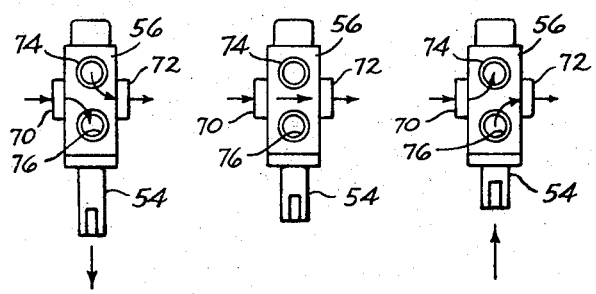

FIGS. 5, 6, and 7 show a valve provided in the vehicle, and how fluid flow takes place through the valve with the spool thereof adjusted to different positions.

Figure 1:
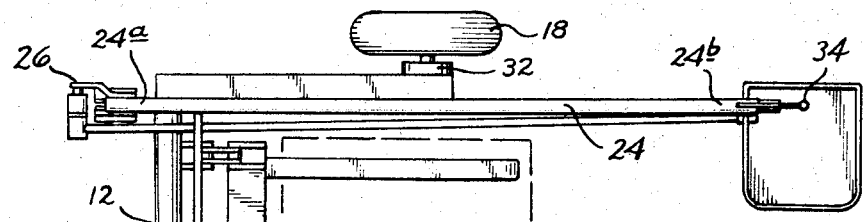
FIG. 1 is a plan view, somewhat simplified, illustrating a three-wheeled vehicle with boom incorporating the speed, turning and direction control system of the invention.

Referring now to the drawings, and first of all more particularly to FIG. 1, a three-wheeled vehicle is shown generally at 10, such as might be used by a fruit grower in the picking of fruit, spraying, trimming and other care of his orchard. The vehicle includes a vehicle frame 12, and wheels 14, 16 and 18 supporting this frame for movement over the ground.

Wheels 16 and 18 are power-driven wheels, and in a broader sense comprise rotatable vehicle propelling means disposed, one on one side, and one on the other side of the vehicle. Wheel 14 is journaled adjacent the base of a swivel bracket 20 which swivels at 22 about a substantially upright axis. With such a vehicle, turning is readily accomplished by braking one of the wheels 16, 18 while rotating the other wheel, with the end of the vehicle supported by wheel 14 then swinging with swivelling of wheel 14. For even sharper turning, one of the wheels 16, 18 may be rotated in one direction and the other wheel rotated in the opposite direction to turn the vehicle more or less on itself. Movement of the vehicle in a straight line is produced by rotating both of the wheels 16, 18 in the same direction, the direction in which the vehicle travels being determined by the direction in which the wheels are rotated. As will hereinafter become apparent, the direction, turning and speed control system of the invention permits handling of the vehicle in all of these fashions, and the type of movement produced is controlled entirely by manipulation of a single control member or joy stick.

The vehicle further includes a boom 24 which has end 24a pivoted at 26 to a portion of the vehicle frame. The pivot connection enables the opposite end 24b of the boom to be raised, with the boom when undergoing such movement swinging about a horizontal, transversely extending axis. At 28 is an operator's platform on which an operator may station himself while using the vehicle. Means (not shown) is provided for raising end 24b of the boom under power, which has the result of placing an operator on the operator's platform at different elevations relative to the ground. Various modifications of a vehicle with boom of this general description are described in my above-referred to application, and reference may be had to such application for a more complete description of the functions of such a vehicle and how the same may be used.

As contemplated herein, wheels 16 and 18 are rotated under power by connecting each to a separate reversible motor. Thus, shown at 30 is a conventional hydraulic motor having its output shaft connected to wheel 16. The motor is reversible, by changing the direction of flow through the motor of the hydraulic fluid required to energize it. Shown at 32 is another hydraulic motor of similar description, with its output shaft connected to wheel 18.

The supply of hydraulic fluid to these motors, and the flow direction to the motors (and thus their running direction), is controlled by manipulation of a control member or a joy stick shown at 34. The joy stick, it will be noted, is located adjacent end 24b of the boom, to be readily accessible to an operator standing on platform 28.

The joy stick has a universal mounting which permits angular movement of the stick in all directions. Thus, secured to the end of the boom is a bracket 36. Member 38 depends from the end of the bracket, which member is mounted adjacent its upper end, at 40, for pivotal movement about a substantially horizontal axis. Journaled on member 38 is a sleeve 42, which sleeve on rotating upon the member rotates about a substantially vertical axis. A plate 44 is suitably secured to the base of sleeve 42, and joy stick 34 is joined to a side of sleeve 42 as by welding. From this description it should be apparent that the free end of the joy stick is movable up and down, as indicated by arrows 46, with such movement accompanied with pivoting of member 38 about pivot 40. The joy stick is also movable back and forth, in a direction indicated by arrows 48, or a direction extending transversely of the first described path of movement with such movement accompanied with rotation or swivelling of sleeve 42 about member 38.

For various reasons, including the fact that better balance is obtained, hydraulic hose lengths are minimized, and the operator's station remains less cluttered, the valve means that controls fluid flow to the hydraulic motors is located adjacent the base of the boom (end 24a), or at a point remote from where the joy stick is located. The valve means referred to, in the embodiment of the invention discloses herein, comprises valve mechanism 50 controlling flow to motor 30 and valve mechanism 52 controlling flow to motor 32. Each of these valve mechanisms includes a valve member or spool, such as spool 54 of valve mechanism 50, which is extensible from and retractable into a valve housing 56 when adjusting the valve mechanism. In the embodiment of the invention illustrated, the valve housings are secured by fasteners 57 to a plate 59 joined to the underside of the boom.

Figure 2:
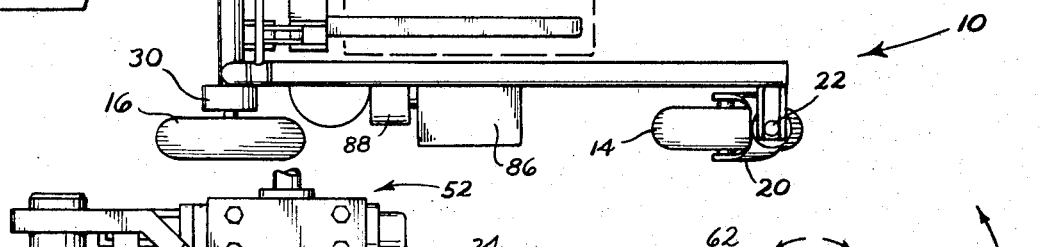
FIG. 2 is a somewhat enlarged view showing portions of the boom in the vehicle, and an operating lever mounted on one end of this boom.
Figure 3:
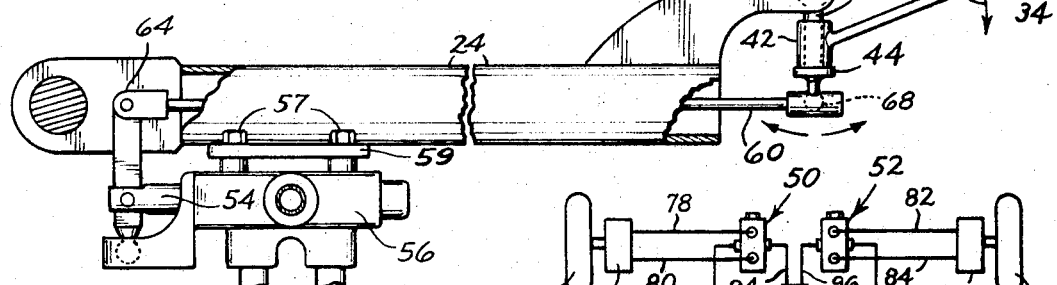
FIG. 3 is a side view of the structure illustrated in FIG. 2.

Connecting plate 44 of the joy stick to the valve-spools of these valve mechanisms are rods 60, 62. Further describing this connection, it will be noted that boom 24 is hollow, and as best shown in FIGS. 2 and 3, rods 60, 62 extend along the interior of the boom. The rods are substantially parallel, as are the valve-spools of the valve mechanisms. The connection of each rod with the valve-spool is through a pivoted clevis connection, such as that shown in 64, with a piece 66 secured to the valve-spool. The opposite end of each rod is connected, through a ball joint 68, to plate 44. The ball joint connection for the two rods, it will be noted in FIG. 2, are on either side of the joy stick and the vertical pivot axis about which the joy stick is movable.

Each valve mechanism, and referring to FIGS. 5, 6, and 7, includes an inlet port 70, an exhaust port 72, and a pair of ports 74, 76 which are utilized in connecting the valve mechanism to the hydraulic motor it controls. Thus, lines or hoses 78, 80 (see FIG. 4) connects such ports of mechanism 50 to motor 30, and hoses 82 to 84 connects such ports of mechanism 52 to motor 32.

With each valve mechanism, the valve-spool has a neutral position, shown in FIG. 6. In this neutral position, the ports 74, 76 are blocked off, whereby flow in any direction through the ports and the hoses connected thereto is prevented. Ports 70, 72 are connected, to permit flow through the valve. On the spool being advanced into the valve housing from its neutral position, as shown in FIG. 7, the inlet port is opened up to port 74, and the exhaust port 72 is opened up to port 76. The farther the spool is advanced into the housing, the greater the communication between these ports which is produced. This adjustment therefore has the effect of producing flow through the motor in one direction, and the adjustment enables control of the rate of flow in this one direction. When the valve-spool is retracted from the housing, as shown in FIG. 5, inlet port 70 is opened up to port 76 and the exhaust port 72 is opened up to port 74. This results in reverse flow through the hydraulic motor. The rate of flow again is determined by the extent that the valve-spool is retracted from the housing.

Figure 4:
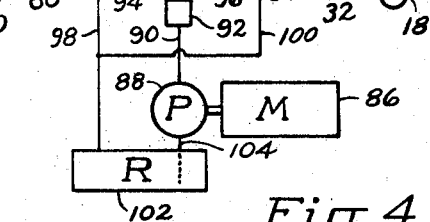
FIG. 4 is a schematic view illustrating a hydraulic circuit contemplated.

In FIG. 1 it will be noted that the vehicle has an internal combustion engine 86, which engine is connected to a hydraulic pump 88 for driving the pump. Referring to FIG. 4, which shows schematically the hydraulic circuit which may be incorporated with the vehicle, the output from pump 88 flows through a line 90 to a flow divider 92 operable to divide the amount of fluid pump by the pump and emanating from the flow divider equally between lines or conduits 94, 96. Line 94 connects with the inlet port of valve mechanism 50 and line 96 connects with the inlet port of valve mechanism 52. The exhaust ports of these valve mechanisms connect through lines 98, 100 to a reservoir 102. Extending from this reservoir to the inlet of pump 88 is a conduit 104 which supplies the pump. From this it will be seen that in the hydraulic circuit, the valve mechanisms are arranged in parallel, and each is supplied with an equal valume of fluid by the pump.

Before describing the operation of the apparatus as a whole, it will be pointed out that on moving the joy stick up or down in its path, about the horizontal axis provided by pivot connection 40, rods 60, 62 are retracted or advanced simultaneously, and to the same extent there is similar retraction or advancement of the valve-spools. This therefore produces an adjustment in the valves mechanisms which is the same for both valve mechanisms. On the joy stick being swung from right to left, about the vertical axis provided by sleeve 42, plate 44 is swung in a similar manner, which causes one of the rods to be advanced while the other one is retracted. As a result, one of the valve-spools is retracted from its housing while the other valve-spool is advanced into its housing. This results in control of the rate of supply and flow direction of fluid to one hydraulic motor which is in an opposite sense to the control of rate of supply and flow direction for the other hydraulic motor. Further explaining, and assuming that the valve-spools originally are each in their neutral position, on the joy stick being swung to one side, the valve-spool of one valve mechanism will be adjusted to produce flow in one direction through its hydraulic motor and the valve-spool of the other valve mechanism will be adjusted to produce flow of hydraulic fluid in the opposite direction through its other motor. Assuming that originally the valve-spools of the two valve mechanisms have the same relative positions in their housing, but both are displaced from their neutral positions, on such side-swinging of the joy stick, the rate of flow of hydraulic fluid to one motor will be increased while the rate of flow of hydraulic fluid to the other motor will be decreased.

Explaining now the operation of the vehicle as a whole, with the pump operating and the joy stick in a position that places the two valve-spools in a neutral position, no flow occurs to either hydraulic motor and hydraulic fluid is directed by the valve mechanisms to the reservoir. To produce movement of the vehicle along a substantially straight path, the joy stick is moved up or down, the particular direction in which the joy stick is moved depending upon the direction of travel desired in the vehicle. For the purpose of steering the vehicle, and producing a turn, the joy stick is swung to one side, the particular side depending upon the direction in which it is desired to have the vehicle moved. With the joy stick originally positioned before side shifting so that both valves have their spools in neutral positions, such a side shifting has the effect of producing rotation of one motor in one direction and the other motor in the opposite direction, and a sharp turn is produced. If the side shifting is done with the joy stick in a position producing vehicle travel, the side shifting of the joy stick has the effect of increasing the supply of hydraulic fluid flowing through one motor and decreasing the supply fed to the other motor to produce a turn on a larger radius.

From the above it should be obvious that the apparatus contemplated has a number of novel features and advantages. Of primary importance, the steering and drive system is extremely simple and readily installed on a vehicle. The apparatus permits an operator to have full control of the vehicle, both with respect to the speed at which the vehicle travels, the direction in which it travels, and turning. With the valve mechanisms remote from the joy stick, and the rod or bar linkage system provided which connects the joy stick and valve mechanisms, the system is particularly suitable for vehicles such as the one shown, which includes a boom with a platform on said boom supporting the operator who is to manipulate the controls. By extending such rods through the hollow interior of the boom, they are protected, and accidental adjustment of the valves by reason of some obstruction striking the rods, is inhibited.

While an embodiment of the invention has been described, it should be obvious that modifications and variations are possible without departing from the concepts thereof. It is desired to cover herein all modifications of the invention as would be apparent to one skilled in the art, and that come within the scope of the appended claims.

It is claimed and desired to secure by Letters Patent:

1. In a vehicle including rotatable vehicle propelling means located on each side of the vehicle, and pressure fluid-operated motors, reversible by changing flow direction thereto, connected to said propelling means for rotating them under power; a boom with one end journaled on the vehicle for up and down swinging movement of an opposite free end of the boom, valve mechanism for said motors including casing structure and adjustable means controlling flow through the valve mechanism, said valve mechanism being disposed adjacent said one end of the boom with said casing structure secured to the boom, a joy stick having a universal mounting permitting angular movement in all directions mounted on the boom adjacent its said free end, rod structure extending along the length of the boom operatively connecting the joy stick with said adjustable flow controlling means of said valve mechanism, and hoses establishing an operative connection between said valve mechanism and said fluid-operated motors permitting relative movement of the valve mechanism with respect to said motors such as occurs on up and down swinging of the boom.

2. The vehicle of claim 1, wherein the boom is hollow and said rod structure is contained within the boom, the valve mechanism is mounted on the outside of the boom, and the boom includes an opening adjacent its said one end with said rod structure extending through said opening to a connection with said adjustable means.

3. The vehicle of claim 2, which further includes a pump for supplying fluid under pressure mounted on the vehicle, and hoses connecting the pump to said valve mechanism permitting relative movement between the pump and valve mechanism such as occurs on up and down swinging of the boom.

References Cited

UNITED STATES PATENTS

| | | | |
|---|---|---|---|
| 2,393,324 | 1/1946 | Joy | 180—6.48 |
| 2,771,958 | 11/1956 | Ball | 180—6.48 |
| 3,156,313 | 11/1964 | Peterson | 180—6.48 |

FOREIGN PATENTS

| | | |
|---|---|---|
| 881,725 | 11/1961 | Great Britain. |

BENJAMIN HERSH, *Primary Examiner.*

J. A. PEKAR, *Assistant Examiner.*